United States Patent
Sakamoto (10) Patent No.: US 6,765,321 B2
(45) Date of Patent: Jul. 20, 2004

(54) THREE-PHASE TOROIDAL COIL TYPE PERMANENT MAGNET ELECTRIC ROTATING MACHINE

(75) Inventor: Masafumi Sakamoto, Kiryu (JP)

(73) Assignee: Japan Servo Co., Ltd., Tokyo-to (JP)

( * ) Notice: Subject to any disclaimer, the term of this patent is extended or adjusted under 35 U.S.C. 154(b) by 26 days.

(21) Appl. No.: 10/171,624

(22) Filed: Jun. 17, 2002

(65) Prior Publication Data

US 2002/0190585 A1 Dec. 19, 2002

(30) Foreign Application Priority Data

Jun. 18, 2001 (JP) ........................................ 2001-183366

(51) Int. Cl.[7] .............................................. H02K 37/00
(52) U.S. Cl. ................................... 310/49 R; 310/257
(58) Field of Search ............................. 310/49 R, 257, 310/68 R, 68 B, 261, 156.41; 318/254, 138–139, 439, 560

(56) References Cited

U.S. PATENT DOCUMENTS

| | | | |
|---|---|---|---|
| 5,013,951 A | * | 5/1991 | Stadnik et al. ......... 310/156.07 |
| 5,128,570 A | | 7/1992 | Isozaki |
| 5,289,064 A | | 2/1994 | Sakamoto |
| 5,386,161 A | | 1/1995 | Sakamoto |
| 5,854,526 A | | 12/1998 | Sakamoto |
| 5,874,795 A | | 2/1999 | Sakamoto |
| 6,121,712 A | * | 9/2000 | Sakamoto .................. 310/254 |
| 6,153,953 A | | 11/2000 | Isozaki et al. |
| 6,160,330 A | | 12/2000 | Sakamoto |
| 6,259,176 B1 | | 7/2001 | Isozaki et al. |
| 6,323,569 B1 | * | 11/2001 | Akama ..................... 310/49 R |
| 6,534,948 B2 | * | 3/2003 | Ohura et al. ................ 318/798 |

OTHER PUBLICATIONS

T. Kenjo, et al., Sogo–Denshi Publishing House, pp. 29–31, "The Basis and Application of Stepping Motor", Feb. 10, 1979 (with partial English translation).

* cited by examiner

Primary Examiner—Tran Nguyen
(74) Attorney, Agent, or Firm—Oblon, Spivak, McClelland, Maier & Neustadt, P.C.

(57) ABSTRACT

A three-phase toroidal coil type electric rotating machine including a rotor that includes a cylindrical permanent magnet having M pairs of N-poles and S-poles that are alternatively arranged around a rotor axis, and a stator that includes three stator units stacked in an axial direction around the cylindrical permanent magnet. Each stator unit has a pair of stator magnetic poles and a toroidal coil sandwiched therebetween. Each stator magnetic pole has M pieces of claw poles extending in the axial direction. The claw poles of the stator magnetic poles are in mesh with each other inside the toroidal coil. The toroidal coils are connected as a delta connection. The positional relationship between the claw poles and the cylindrical permanent magnet is determined such that the phase differences among speed electromotive forces caused in the toroidal coils are 120 degrees (electrical angle) between any two of the three terminals.

12 Claims, 10 Drawing Sheets

|   | $T_1$ | $T_2$ | $T_3$ | $T_4$ | $T_5$ | $T_6$ |
|---|---|---|---|---|---|---|
| 1 | ○ |   |   | ○ |   |   |
| 2 |   |   |   | ○ | ○ |   |
| 3 |   | ○ |   |   | ○ |   |
| 4 |   | ○ | ○ |   |   |   |
| 5 |   |   | ○ |   |   | ○ |
| 6 | ○ |   |   |   |   | ○ |

THREE-PHASE TOROIDAL COIL TYPE PERMANENT MAGNET ELECTRIC ROTATING MACHINE

BACKGROUND OF THE INVENTION

1. The Field of the Invention

The present invention relates to an electric rotating machine used for step drive of various kinds of devices including OA machinery such as printers. In particular the present invention relates to an improvement of a three-phase toroidal coil type permanent magnet electric rotating machine that facilitates synchronized rotation and a brushless construction.

2. Prior Art

A permanent magnet stepping motor (electric rotating machine) consists of a permanent magnet rotor having M pairs of N-poles and S-poles that are alternatively arranged in the circumferential direction around a rotor axis and a stator arranged around the permanent magnet rotor with an air gap.

A stator of a three-phase toroidal coil type stepping motor consists of three stator units stacked in an axial direction.

Each stator unit has a pair of stator magnetic poles, each of which is made of magnetic material to have M pieces of claw poles extending in the axial direction, and a toroidal coil that is sandwiched between the stator magnetic poles. The stator magnetic poles are arranged such that the claw poles of the respective stator magnetic poles are in mesh with each other inside the toroidal coil.

The toroidal coil of each stator unit has two terminals and a driving circuit excites the toroidal coils of the respective phase in turn with six terminal feeding.

In the following description, the phases of the stator units are called U-phase, V-phase and W-phase in this order from an output side of the rotor axis. The claw poles of the stator magnetic pole at the output side of the V-phase have a phase difference of 60/M degrees (mechanical angle) with respect to that of the U-phase. The claw poles of the stator magnetic poles at the output side of the W-phase have a phase difference of 60/M degrees (mechanical angle) with respect to that of the V-phase. In the same manner, the claw poles of the stator magnetic poles at the opposite side have phase differences of 60/M degrees (mechanical angle) with respect to that of the adjacent phases, respectively. A phase difference between the claw poles of the stator magnetic pole at the output side and that at the opposite side of the same phase is 180/M degrees (mechanical angle).

Under the construction, when the permanent magnet rotor is rotated by external force, the toroidal coils generate speed electromagnetic force (referred to as "EMP") due to interlinkage with magnetic flux of the permanent magnets. Phase difference between EMF generated in the toroidal coils of two of three phases is 60 degrees (electrical angle).

The circuit for driving the toroidal coils of the three phases includes three bridge circuits, each of which is provided with a first pair of transistors that feed a current through a toroidal coil in a predetermined direction and a second pair of transistors that feed a current through the toroidal coil in the opposite direction. That is, the driving circuit includes twelve transistors in total.

When the driving circuit drives the above-mentioned three-phase toroidal coil type stepping motor, the circuit feeds a current in a positive direction through the toroidal coils of U, V and W phases in sequence in first three steps, and then the circuit feeds a current in a negative direction through the coils in sequence in later three steps.

This rotates the permanent magnet rotor by 60 degrees (electrical angle) in each step. That is, the rotor rotates 360 degrees by six steps.

The motor can continue rotating by repeating these six exciting steps.

However, there is a defect that the above-described driving circuit requires a large number of transistors.

In order to decrease the number of transistor, it is effective to employ a three-terminal star connection, in which one side terminals of the respective toroidal coils of the three phases are connected at a neutral point, or a three-terminal delta connection, in which the toroidal coils of the three phases are connected in a loop.

However, there is a problem that the above-mentioned conventional three-phase toroidal coil type stepping motor cannot continuously rotate in one direction with a star connection or a delta connection.

Figure 9:
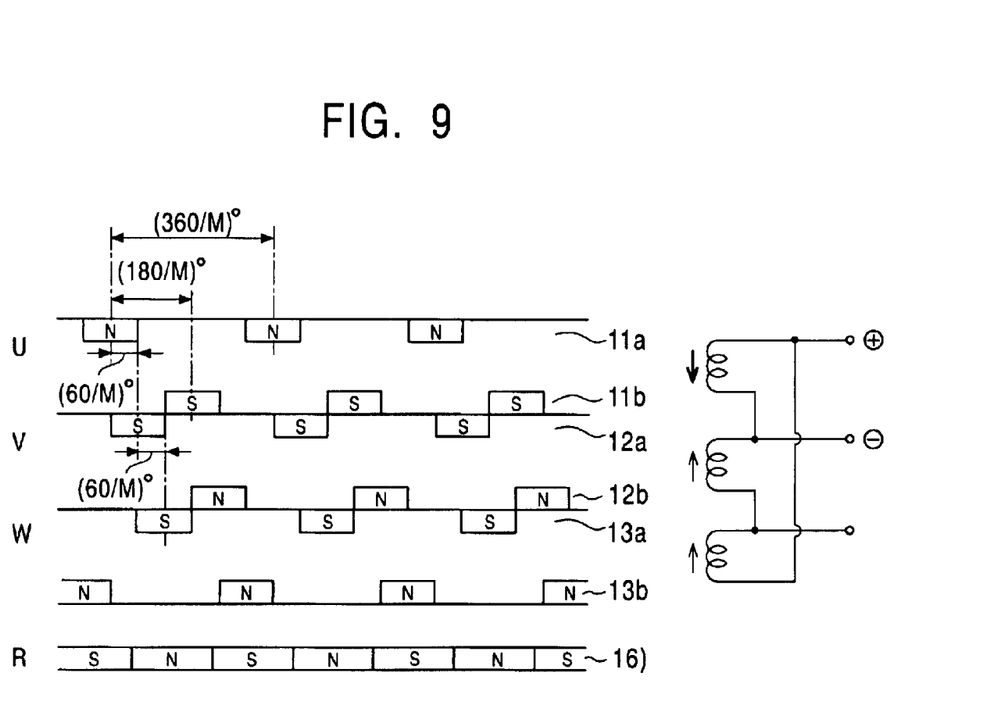
FIG. 9 is a developed view showing a positional relationship between claw poles of stator units and magnetic poles of a cylindrical permanent magnet of a permanent magnet rotor of a conventional three-phase toroidal coil type permanent magnet stepping motor, as with the condition of FIG. 5A.
Figure 10:
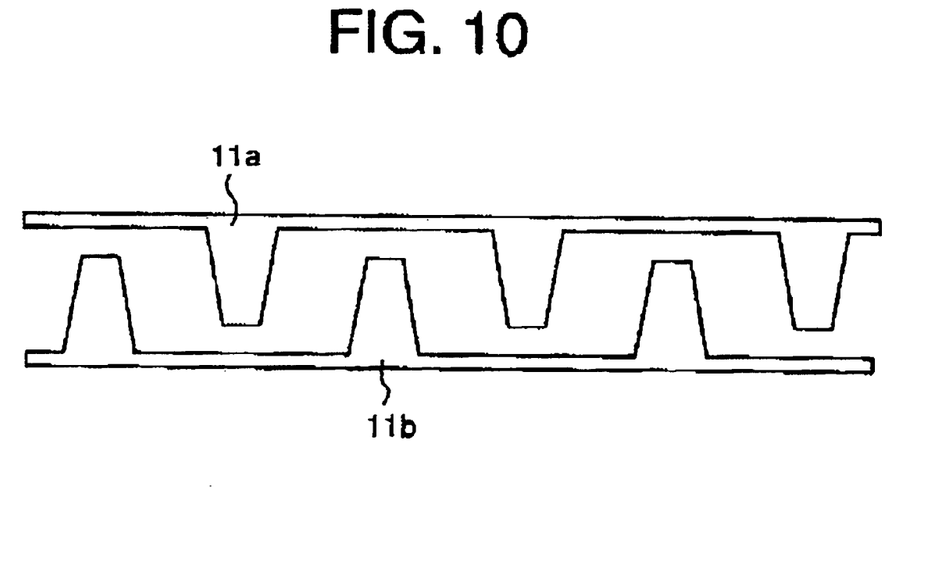
FIG. 10 is a developed view of the claw poles 11a and 11b of the first stator unit 11 with a trapezoidal shape with a tapered tip.

The problem is explained with reference to FIG. 9. As shown in FIG. 9, 11a and 11b denote claw poles formed on the stator unit of U-phase, 12a, 12b, 13a and 13b denote claw poles formed on the stator units of V- and W-phases, respectively, and 16 denotes the rotor.

The claw poles of the respective stator units are excited as shown in FIG. 9 when the coils of the three phases with delta connection are excited in the same manner as FIG. 5A described below.

As described above, since the claw poles 11a, 12a and 13a at the same side of the respective phases are deviated by 60/M degrees in the mechanical angle, the rotor rotates by 60/M degrees in the mechanical angle when the toroidal coils of the U-, V- and W-phases are sequentially excited with a single-phase excitation. However, if the toroidal coils of the three phases are simultaneously excited with the delta connection, the excitation sequence shown in FIGS. 5B, 5C, 6A, 6B and 6C described below cannot form a magnetic field for rotating the rotor by 60 degrees a step in the electrical angle, which interferes with the continuous rotation of the rotor 16 in one direction.

Further since the phase differences among the EMF's of the phases detected from the three terminals are 60 degrees, the rotation angle is related to a torque, which causes torque pulsation. This reduces and changes the torque of the motor, which rises problems of generation of noise and reducing of a positioning accuracy of an object to be driven.

SUMMARY OF THE INVENTION

An object of the present invention is to solve the above described problems of the conventional motor and to provide an improved three-phase toroidal coil type permanent magnet electric rotating machine that is able to prevent torque pulsation even if a star connection or a delta connection is employed to reduce a number of transistors.

A further object of the present invention is to provide an improved three-phase toroidal coil type permanent magnet electric rotating machine that enables closed-loop control through the addition of a position sensor that detect the rotational position of a rotor.

According to a first aspect of the present invention, a three-phase toroidal coil type electric rotating machine comprises a permanent magnet rotor that comprises a cylindrical permanent magnet having M pairs of N-poles and S-poles that are alternatively arranged around a rotor axis, and a stator that comprises three stator units stacked in an axial direction with an air gap with respect to the external wall of the cylindrical permanent magnet, each of which has a pair of stator magnetic poles and a toroidal coil that is sandwiched between the stator magnetic poles, each of the stator magnetic poles being made of magnetic material to have M pieces of claw poles extending in the axial direction, the stator magnetic poles of each stator unit being arranged such that the claw poles of the respective stator magnetic poles are in mesh with each other inside the toroidal coil, wherein terminals of the toroidal coils mounted on the three stator units are connected as a star connection or a delta connection to be three-terminal feeding, wherein flux linkage of each phase formed by the cylindrical permanent magnet is an independent flux linkage that is made up of the magnetic flux from the pole opposite to the claw poles of the corresponding phase only, and wherein the positional relationship between the claw poles of the stator units and the cylindrical permanent magnet is determined such that the phase differences among speed electromotive forces caused in the toroidal coils of the respective phases due to the independent flux linkages are 120 degrees (electrical angle) between any two of the three terminals.

According to a second aspect of the present invention, the toroidal coils are controlled so as to feed the same electric currents through two of three toroidal coils of the stator units.

According to a third aspect of the present invention, an electric rotating machine comprises a permanent magnet rotor that comprises a cylindrical permanent magnet having M pairs of N-poles and S-poles that are alternatively arranged around a rotor axis, and a stator that comprises three stator units stacked in an axial direction with an air gap with respect to the external wall of the cylindrical permanent magnet, each of which has a pair of stator magnetic poles and a toroidal coil that is sandwiched between the stator magnetic poles, each of the stator magnetic poles being made of magnetic material to have M pieces of claw poles extending in the axial direction, the stator magnetic poles of each stator unit being arranged such that the claw poles of the respective stator magnetic poles are in mesh with each other inside the toroidal coil, wherein terminals of the toroidal coils mounted on the three stator units are connected as a delta connection to be three-terminal feeding, wherein flux linkage of each phase formed by the cylindrical permanent magnet is an independent flux linkage that is made up of the magnetic flux from the pole opposite to the claw poles of the corresponding phase only, and wherein the toroidal coils of the respective phases are excited such that the direction of the strong axial magnetomotive force of one phase is usually opposite to that of the weak axial magnetomotive forces of the remaining two phases when voltage is applied to two terminals with a three-phase excitation.

According to a fourth aspect of the present invention, the cylindrical permanent magnet is a polar anisotropic magnet that is anisotropic in the circumferential direction to be divided into the number of poles.

According to a fifth aspect of the present invention, each of the claw poles is formed trapezoidal shape with a tapered tip.

According to a sixth aspect of the present invention, an electric rotating machine further comprises a magnetometric sensor that detects variation of the magnetic field due to the rotation of the permanent magnet rotor, a first switching element group that consists of three switching elements connected between a plus terminal of a power source and the terminals of the three toroidal coils, respectively, and a second switching element group that consists of three switching elements connected between a minus terminal of the power source and the terminals of the three toroidal coils, respectively, wherein the first and second switching element groups are controlled according to the output of the magnetometric sensor such that one switching element of the first switching element group and one switching element of the second switching element group are selected or one switching element of one switching element group and two switching elements of the other switching element group are selected to be turned ON or OFF.

According to a seventh aspect of the present invention, the magnetometric sensor is arranged to face the cylindrical permanent magnet or to face a permanent magnet for sensor, which has 2M magnetic poles and rotates in synchronism with the permanent magnet rotor, with an air gap.

According to an eighth aspect of the present invention, an electric rotating machine further comprises a sensor pole made of magnetic material that is arranged to face the cylindrical permanent magnet or a permanent magnet for sensor having 2M magnetic poles that rotates in synchronism with the permanent magnet rotor with an air gap, and wherein the magnetometric sensor is arranged in the magnetic path passing through the sensor pole.

According to a ninth aspect of the present invention, the rotational position of the permanent magnet rotor is detected based on a waveform of exciting current modulated by a voltage induced in the respective toroidal coils by a magnetic field of the cylindrical permanent magnet, and wherein the toroidal coils are excited in order to produce a continuous rotation torque in the cylindrical permanent magnet based on the detected rotational position.

According to a tenth aspect of the present invention, the toroidal coils are driven by two-phase excitation with two-terminal feeding for the star connection or three-terminal feeding for the delta connection, and wherein one toroidal coil that is not excited is used as a sensor to detect the rotational position of the permanent magnet rotor by sensing speed electromotive force.

DESCRIPTION OF THE PREFERRED EMBODIMENTS

A preferred embodiment of the three-phase toroidal coil type permanent magnet stepping motor (rotating machine)

according to the present invention will be described with reference to FIGS. 1 through 8.

Figure 1:
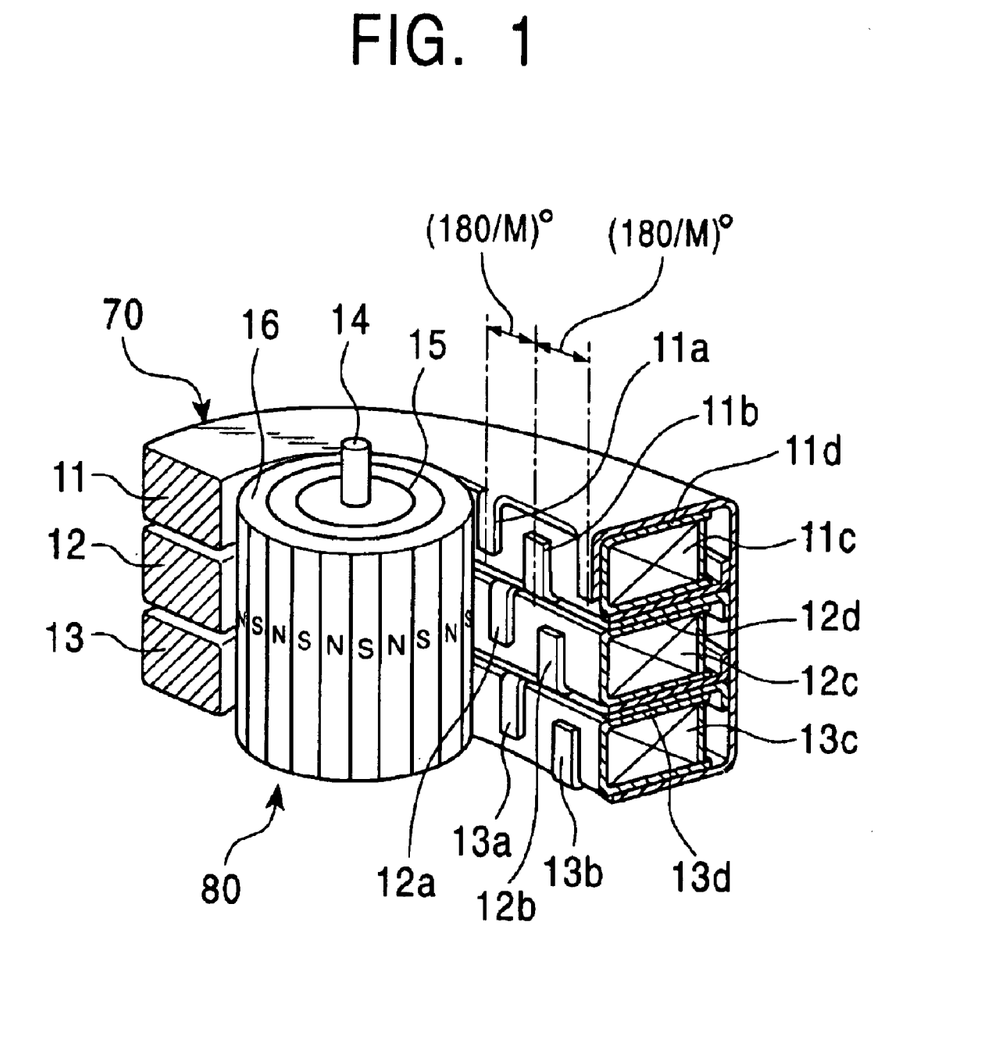
FIG. 1 is a perspective view showing a substantial part of a three-phase toroidal coil type permanent magnet stepping motor according to an embodiment.

FIG. 1 is a perspective view showing the substantial part of the three-phase toroidal coil type permanent magnet stepping motor according to the embodiment. As shown in FIG. 1, the motor consists of a circular stator 70 and a permanent magnet rotor (referred to as a rotor in the following description) 80 arranged inside the stator 70 with an air gap.

The rotational axis 14 of the rotor 80 is supported by bearings (not shown) that are mounted on both center ends of the stator 70. The upper side is an output side and the lower side is an anti-output side in FIG. 1.

The stator 70 consists of three stator units 11, 12 and 13 stacked in an axial direction, which act as stator phases, respectively. The first stator unit 11 is provided with a pair of stator magnetic poles that are made of magnetic material into cup-shape with M pieces of claw poles 11a and 11b extending in the axial direction and a toroidal coil 11c that is wound around a bobbin 11d to be sandwiched between the stator magnetic poles in the axial direction. The stator magnetic poles are arranged such that the claw poles 11a and 11b of the respective stator magnetic poles are in mesh with each other inside the toroidal coil 11c.

The second and third stator units 12 and 13 are provided with pairs of stator magnetic poles having claw poles 12a, 12b, 13a and 13b and toroidal coils 12c and 13c that are wound around bobbins 12d and 13d to be sandwiched between the stator magnetic poles, respectively, in the same manner as the first stator unit 11.

The toroidal coils 11c, 12c and 13c are wound in the same direction. The toroidal coils of the three phases are connected as a three-terminal star connection, in which one side terminals of the respective toroidal coils are connected at a neutral point, or a three-terminal delta connection, in which the toroidal coils are connected in a loop.

An interval between the adjacent claw poles 11a and 11b of the first stator unit 11 is 180/M degrees in a mechanical angle. Intervals between the adjacent claw poles of the second and third stator units 12 and 13 are the same as that of the first stator unit 11.

Further, the claw poles 11a of the stator magnetic pole of the first stator unit 11 at the output side are deviated from the claw poles 12a of the stator magnetic pole of the second stator unit 12 at the output side by 120/M degrees in the mechanical angle (120 degrees in the electrical angle). Still further, the claw poles 12a of the stator magnetic pole of the second stator unit 12 at the output side are deviated from the claw poles 13a of the stator magnetic pole of the third stator unit 13 at the output side by 120/M degrees in the mechanical angle (120 degrees in the electrical angle). In the same manner, the claw poles 11b, 12b and 13b of the stator magnetic poles at the anti-output side are deviated by 120/M degrees in the mechanical angle (120 degrees in the electrical angle), respectively.

The rotor 80 consists of the rotor axis 14, a core cylinder fixed around the rotor axis 14 and a cylindrical permanent magnet 16 arranged around the core cylinder 15. The cylindrical permanent magnet 16 has M pairs of N-poles and S-poles that are alternatively arranged in the circumferential direction.

Figure 2:
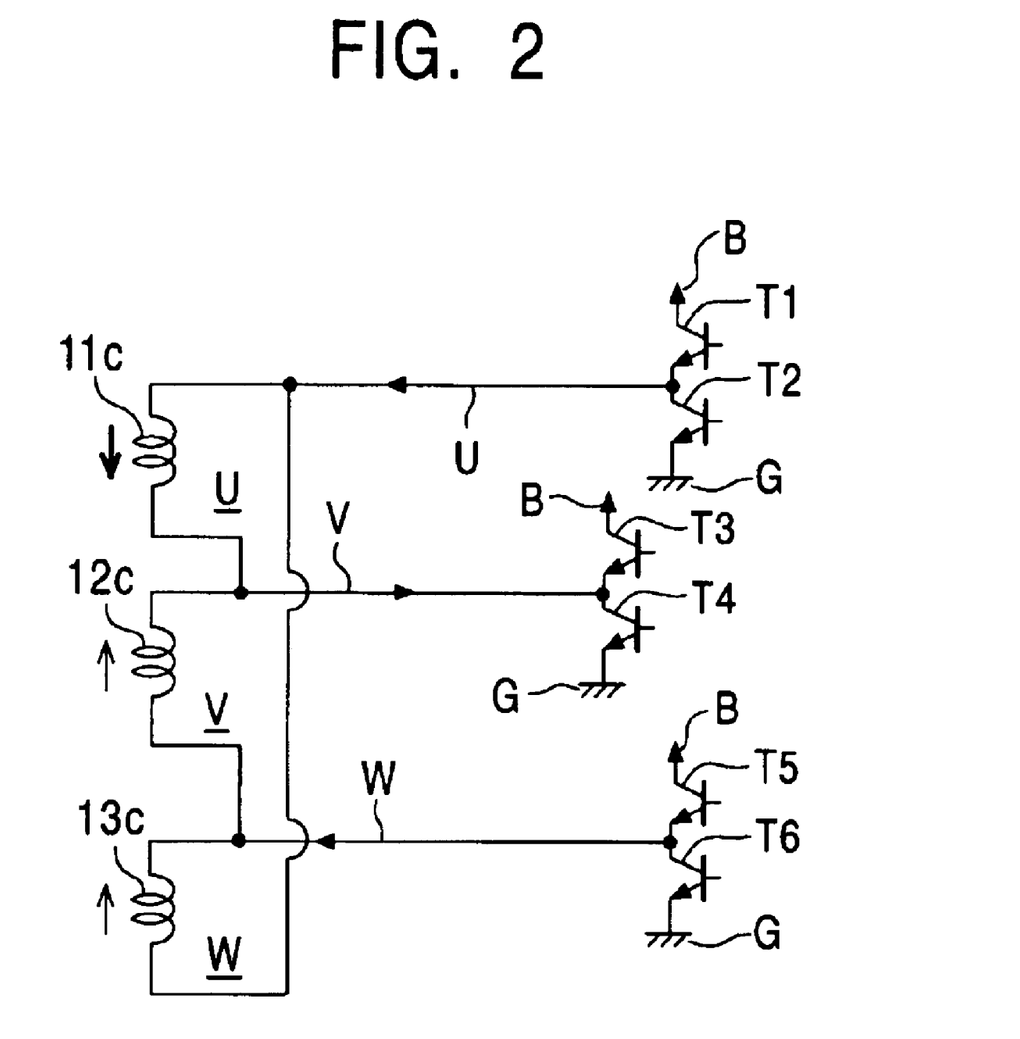
FIG. 2 is a circuit diagram of a driving circuit for the motor of FIG. 1 when the toroidal coils are connected as a delta connection.

FIG. 2 is a circuit diagram of a driving circuit for the delta connection. The winding-start terminals of the toroidal coils 11c, 12c and 13c are represented by U, V and W, and the winding-end terminals thereof are represented by U, V and W, respectively.

Transistors $T_1$ and $T_2$ are connected in series between a plus terminal B of a power source and a minus terminal G, and the winding-start terminal U and the winding-end terminal W are connected to the junction point of the transistors $T_1$ and $T_2$. In the same manner, the winding-start terminal V and the winding-end terminal U are connected to the junction point of transistors $T_3$ and $T_4$ in series, the winding-start terminal W and the winding-end terminal V are connected to the junction point of transistors $T_5$ and $T_6$ in series.

In the following description, the toroidal coil 11c between the winding-start terminal U and the winding-end terminal U is referred to as a U-phase coil. The toroidal coils 12c and 13c are referred to as a V-phase coil and a W-phase coil, respectively.

Incidentally, the rotation of the rotor 80 in one direction by external forces generates EMF's in the respective toroidal coils. The phase of the EMF appeared at each of the terminals U, V, W, U, V and W varies depending on the positional relationship among the claw poles 11a, 11b, 12a, 12b, 13a and 13b. If the EMF appeared between the respective terminals is a sine wave and the phase difference is 120 degrees in the electrical angle, the EMF's generated in the respective toroidal coils are counterbalanced, which prevents torque pulsation.

The above situation will be described hereinafter.

The values Eu, Ev and Ew of the EMF's generated in the U-, V- and W-phase coils can be approximated to a sine wave shown in the following equation in consideration of trapezoidal shaping of the claw poles or the like.

$$Eu = E \sin \theta \tag{1a}$$

$$Ev = E \sin(\theta - 2\pi/3) \tag{1b}$$

$$Ew = E \sin(\theta - 4\pi/3) \tag{1c}$$

Where E is the maximum value of the EMF and $\theta$ is the rotation angle of the rotor 80.

The electric currents Iu, Iv and Iw that pass through the U-, V- and W-phase coils are approximated to the following equation in consideration of a high-resolution micro-step driving.

$$Iu = I \sin \omega t \tag{2a}$$

$$Iv = I \sin(\omega t - 2\pi/3) \tag{2b}$$

$$Iw = I \sin(\omega t - 4\pi/3) \tag{2c}$$

Where I is the maximum value of the electric current, $\omega$ is an angular frequency of the current and t is a time.

On the other hand, the torque T generated by the EMF is given by the following equation.

$$T = (EuIu + EvIv + EwIw)/\omega m \tag{3}$$

$$\theta = \omega t - \delta \tag{4}$$

Where $\omega m$ is a mechanical angular speed of the rotor and $\delta$ is a phase difference between each EMF and an electric current. Substituting the equations (1a), (1b), (1c), (2a), (2b), (2c) and (4) into the equation (3) and rearranging give the following equation (5).

$$T = (3/2\omega m)EI \cos \delta \tag{5}$$

Since the value of $\cos \delta$ is constant, the torque T represented by the equation (5) is constant without regard to the rotation angle $\theta$. Accordingly, the torque generated by the speed electromotive force is constant during rotation in the three-phase toroidal coil type permanent magnet stepping motor of the embodiment, which prevents the torque pulsation and improves the stability of rotation.

Further, if the phase difference among the EMF's from three terminals of the respective toroidal coils 11c, 12c and 13c with a star connection or a delta connection is not equal to 120 degrees, the equation expressing the torque T, which is equivalent to the equation (5), includes the rotation angle $\theta$ and the angular frequency $\omega$ of the electric current as variations depending on the rotation angle of the rotor, which changes the torque T according to the rotation angle $\theta$. Therefore, it is impossible to have a constant torque.

Next, the operation of the motor driven by the driving circuit of FIG. 2 will be described with reference to FIGS. 2 through 6.

Figure 3:
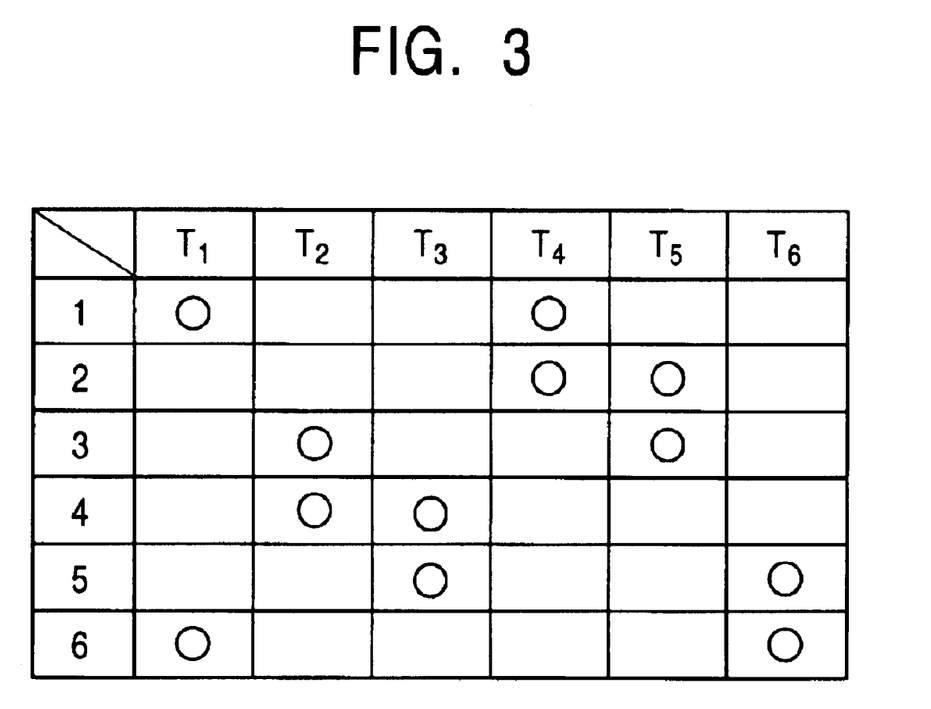
FIG. 3 shows a table describing an operation sequence of the transistors of the driving circuit shown in FIG. 2.

FIG. 3 shows a table describing an operation sequence of the transistors $T_1$ through $T_6$ shown in FIG. 2. The horizontal rows are divided by the transistors T1 through T6 and the vertical lines are divided by the operation steps 1 through 6. A circle in a cell represents that the transistor of the line is conducting at the operation step.

Figure 4:
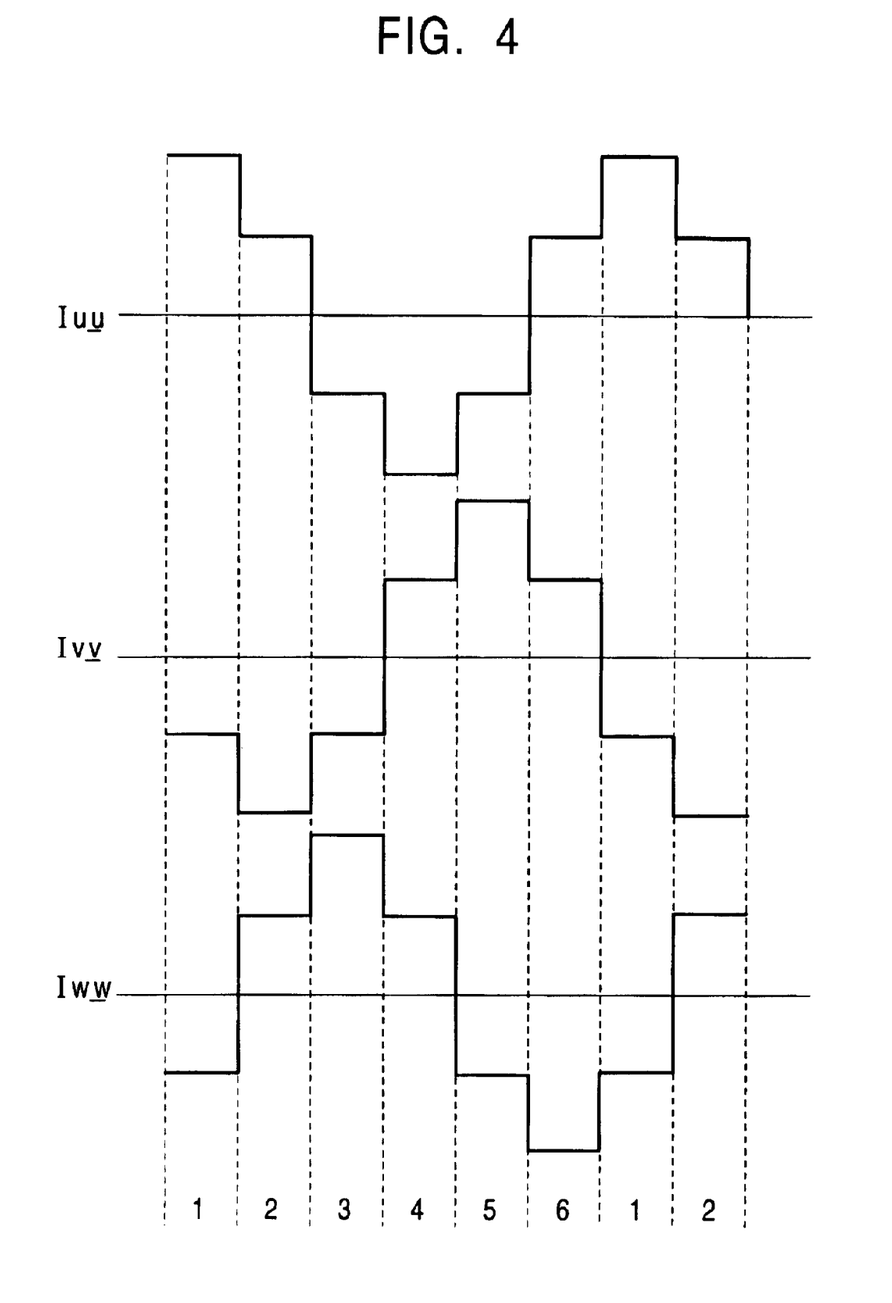
FIG. 4 shows waveforms of currents passing through toroidal coils of three phases at the respective steps of the operation sequence shown in FIG. 3.

Further, FIG. 4 shows waveforms of the electric currents Iuu, Ivv and Iww passing through the toroidal coils 11c, 12c and 13c of three phases at the respective steps of the operation steps 1 through 6 shown in FIG. 3. The direction of electric current from the winding-start terminals U, V, W to the winding-end terminals U, V and W is defined as a positive direction and the reverse direction is defined as a negative direction. FIGS. 5A, 5B, 5C, 6A, 6B and 6C show the conditions of the steps 1 through 6 in FIG. 3 for describing the principle of the stepping motor according to the embodiment.

In step 1, the transistors $T_1$ and $T_4$ turn ON as shown in FIG. 3, the electric current Iuu passes through the U-phase coil 11c in the positive direction and the other electric currents Ivv and Iww pass through the V- and W-phase coils 12c and 13c in the negative direction, respectively. The currents Ivv and Iww have the same magnitude and the magnitude of the current Iuu is twice as large as that of the current Ivv. The reason of the difference is that the impedance of the U-phase coil 11c only becomes half of that of the V- and W-phase coils in series.

Figure 5A:
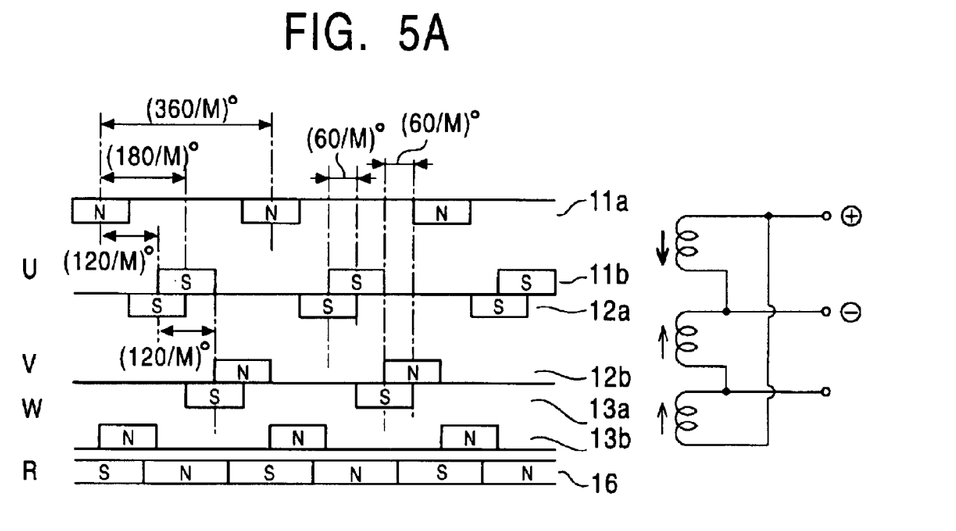
FIGS. 5A, 5B and 5C are developed views showing positional relationships between claw poles of the stator units and magnetic poles of a cylindrical permanent magnet of the permanent magnet rotor of the motor shown in FIG. 1, FIGS. 5A, 5B and 5C show the conditions of the steps 1, 2 and 3 in FIG. 3, respectively.

The polarities of the claw poles 11a, 11b, 12a, 12b, 13a and 13b and the rotational position of the cylindrical permanent magnet 16 (shown as an R-phase in the drawing) in step 1 are shown in FIG. 5A. The electric currents passing through the coils 11c, 12c and 13c are represented by arrows. The direction of the current is shown by the orientation of the arrow and the magnitude of the current is shown by the line width thereof. A thick line represents double magnitude of a thin line.

Figure 5B:
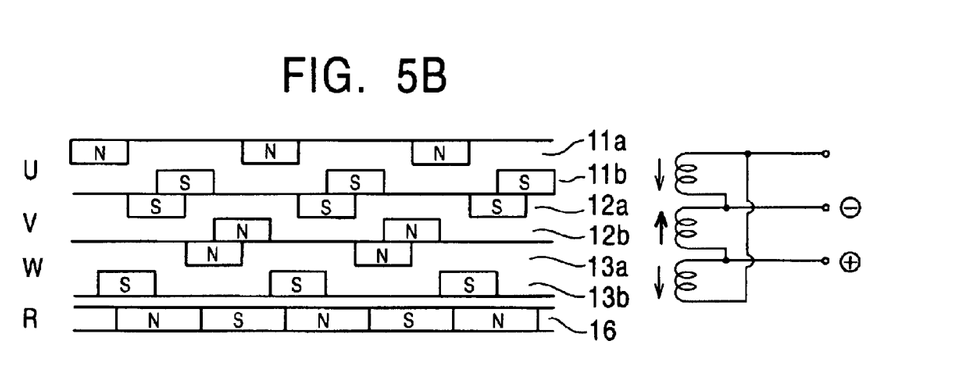
Figure 5C:
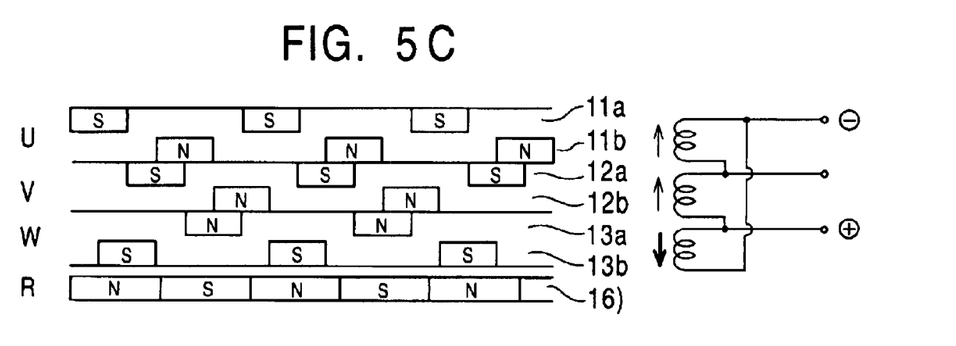
Figure 6A:
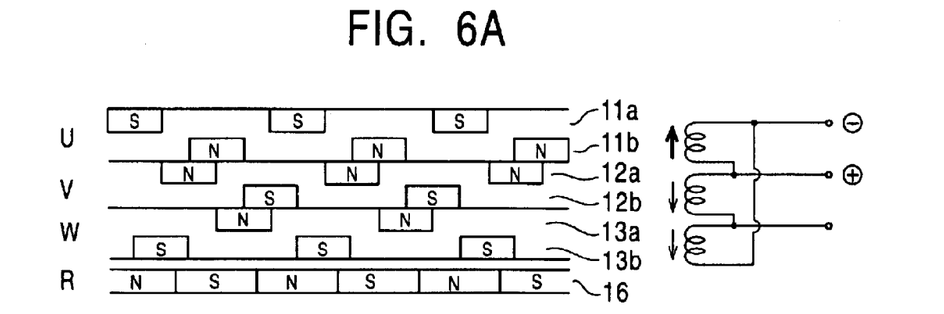
FIGS. 6A, 6B and 6C are developed views showing positional relationships between the claw poles of the stator units and the magnetic poles of the cylindrical permanent magnet of the permanent magnet rotor of the motor shown in FIG. 1, FIG. 6A, 6B and 6C show the conditions of the steps 4, 5 and 6 in FIG. 3, respectively.
Figure 6B:
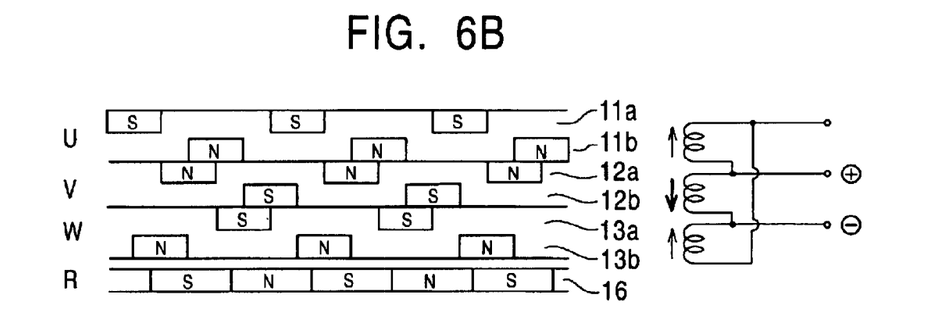
Figure 6C:
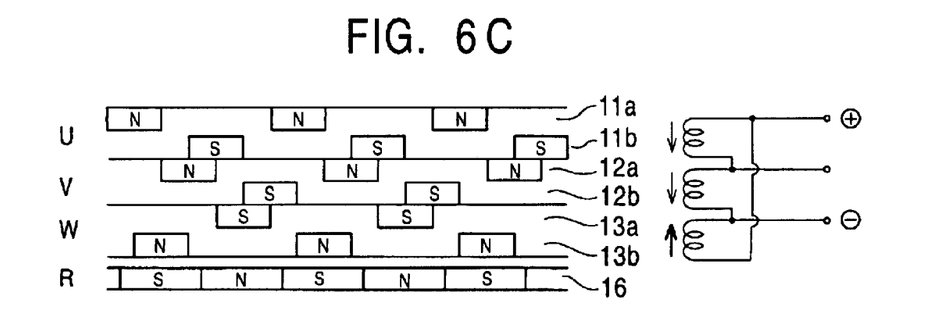

In step 2, the transistors $T_4$ and $T_5$ turn ON as shown in FIG. 3. The shift from step 1 to step 2 changes the condition of the currents. That is, the current Iuu keeps its direction with a half magnitude, the current Ivv keeps its direction with a double magnitude and the current Iww inverts its direction with keeping the same magnitude. The polarities of the claw poles 11a, 11b, 12a, 12b, 13a and 13b and the rotational position of the cylindrical permanent magnet 16 vary as shown in FIG. 5B in step 2.

After that, two transistors among the six transistors T1 through T6 turn ON according to the sequence shown in FIG. 3, and the currents Iuu, Ivv and Iww vary as shown in FIG. 4. In synchronization with the variation, the polarities of the claw poles 11a, 11b, 12a, 12b, 13a and 13b and the rotational position of the cylindrical permanent magnet 16 vary in order as shown in FIGS. 5C through 6C, which rotates the rotor 80 by 1/6 pitch of the magnetic pole of the cylindrical permanent magnet 16 in each step.

The above described sequence shows a step-drive of the three-phase toroidal coil type permanent magnet stepping motor of the embodiment with an open-loop control on the precondition that the motor is applied to an OA device or the like. The motor of the embodiment is also available as a closed-loop type blushless motor that is driven by feeding a current to the coil based on the rotational position of the cylindrical permanent magnet so as to rotate the rotor 80 continuously.

Figure 7:
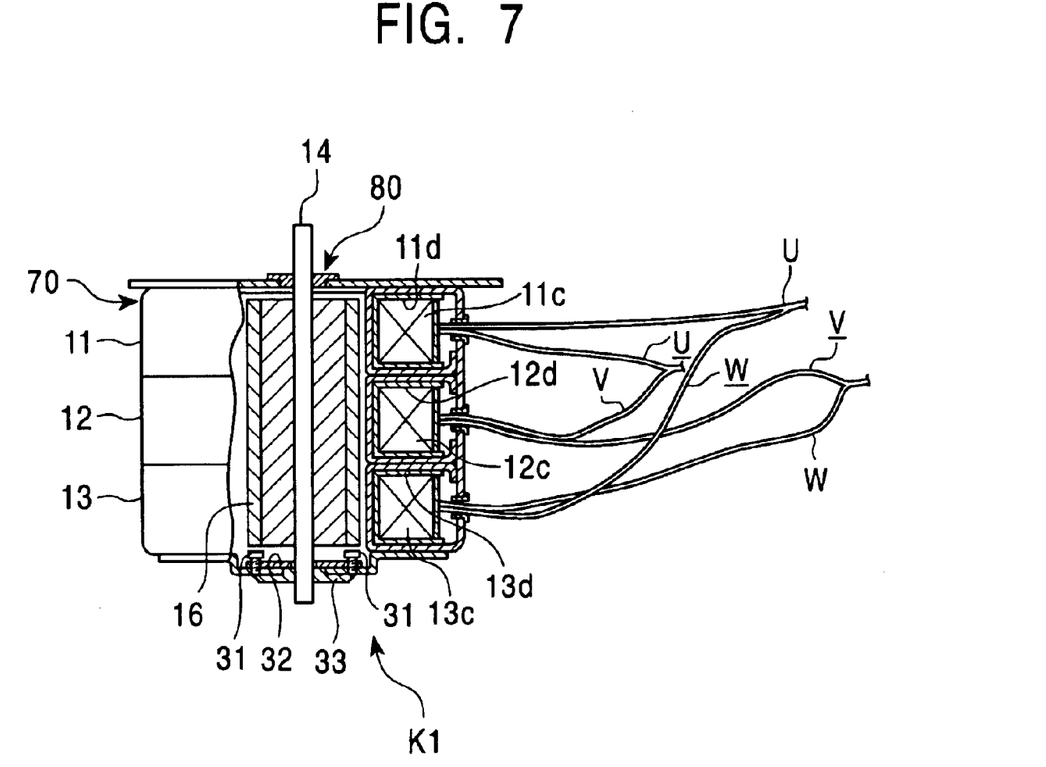
FIG. 7 is a partial sectional view of the motor of FIG. 1 with a rotational position detecting mechanism.

The closed-loop control requires a position sensor that detects the rotational position of the cylindrical permanent magnet 16. First and second examples of actual construction of the rotational position detecting mechanism will be described with reference to FIGS. 7 and 8. FIG. 7 is a partial it sectional view of the motor of FIG. 1 with a first rotational position detecting mechanism K1. In FIG. 7, the elements corresponding that shown in FIGS. 1 and 2 are represented by the same references and the descriptions thereof are omitted.

As shown in FIG. 7, the rotational position detecting mechanism K1 includes three Hall effect devices as magnetometric sensors 31. The magnetometric sensors 31 are arranged on a printed board 32 so as to face the edge of the cylindrical permanent magnet 16 with a predetermined air gap. The magnetometric sensors 31 sense variation of magnetic flux from the cylindrical permanent magnet 16 and a control circuit (not shown) switches switching transistor of a driving circuit to rotate the rotor continuously. When the driving circuit of FIG. 2 is employed, the control circuit switches the transistors $T_1$ through $T_6$ according to the sequence of FIG. 3.

When the driving circuit includes small capacity transistors, the driving circuit can be arranged on the printed board 32 together with the magnetometric sensors 31. Alternatively, the driving circuit may be integrated in the motor as a part separated from the printed board 32, or it may be added externally with electric connection.

The three magnetometric sensors 31 arranged on the printed board 32 along the circle facing the cylindrical permanent magnet 16 at the 120 degrees interval in the mechanical angle, for example. The printed board 32 is supported by a back cover 33.

The rotational position detecting mechanism K1 of the first example is constructed of the printed board 32 on which the magnetometric sensors 31 are arranged.

When the permanent magnet electric rotating machine of FIG. 7 that includes the above-described rotational position detecting mechanism K1 is driven by the driving circuit shown in FIG. 2, two transistors, one is connected to the positive terminal of the power source and the other is connected to the negative terminals, among the six transistors $T_1$ through $T_6$ are usually kept ON.

Further, when a total of three transistors in FIG. 2 including the transistor $T_1$ that is connected to the positive terminal of the power source and the transistors $T_4$ and $T_6$ that are connected to the negative terminal turn ON at the same time, the potentials of the terminals V and W becomes zero, which enables two-phase excitation for the U- and W-phase coils 11c and 13c because the current does not pass through the V-phase coil 12c.

Figure 8:
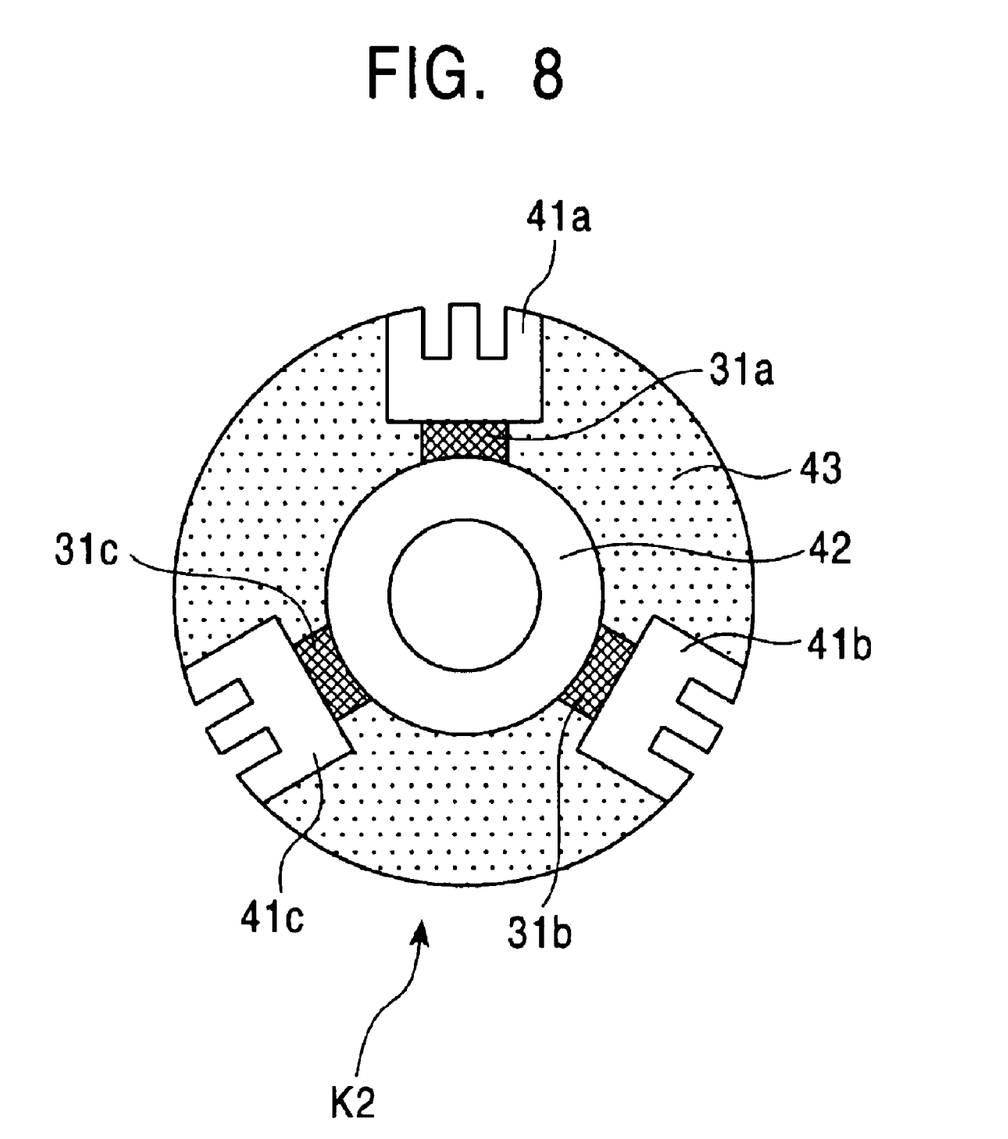
FIG. 8 is a plan view of another rotational position detecting mechanism.

Next, a rotational position detecting mechanism K2 of the second example will be described. FIG. 8 is a plan view of the rotational position detecting mechanism K2 that consists of magnetometric sensors assembled as a unit.

In FIG. 8, the magnetometric sensors 31a, 31b and 31c are arranged along a circle at regular intervals. The outer peripheries of the magnetometric sensors 31a, 31b and 31c are connected to magnetic steel claw poles 41a, 41b and 41c, respectively, and the inner peripheries are connected to the magnetic steel yoke 42 of a ring shape. The magnetic steel claw poles 41a, 41b and 41c are precisely aligned such that the outer peripheries thereof face the edge of the cylindrical permanent magnet 16 (see FIGS. 1 and 7) of the permanent magnet rotor to induce magnetic flux to the magnetometric sensors 31a, 31b and 31c. The magnetic steel yoke 42 shorts the magnetometric sensors 31a, 31b and 31c. A reference 43 denotes non-magnetic plate. The rotational position detecting mechanism K2 is constructed by the magnetometric sensors 31a, 31b, 31c, the magnetic steel claw poles 41a, 41b, 41c, the magnetic steel yoke 42 and the non-magnetic plate 43 that are integrally assembled.

The rotational position detecting mechanism K2 shown in FIG. 8 receives magnetic flux by the magnetic steel claw poles 41a, 41b and 41c that induce the magnetic flux to the magnetometric sensors 31a, 31b and 31c. The transistors of the driving circuit such as that in FIG. 2 are controlled based on the signals from the magnetometric sensors 31a, 31b and 31c.

The rotational position detecting mechanism K2 is suitable for a motor whose cylindrical permanent magnet 16 of the rotor 80 has a small outer shape and a large number of magnetic poles. In such a case, since the error in the mechanical angle results in M-fold error in the electrical angle, precisely alignment is required. However, if the magnetometric sensors are separately arranged, it is difficult to precisely align the sensors to the cylindrical permanent magnet. Since the magnetometric sensors 31a, 31b and 31c of the rotational position detecting mechanism K2 are integrally assembled as a single unit, the sensors can be precisely arranged at the regular intervals (120 degrees in the mechanical angle, for example) with the precise alignment to the edge of the cylindrical permanent magnet.

The scope of the present invention is not limited to the above-described embodiment and various modifications are available.

The three-phase toroidal coil type permanent magnet electric rotating machine of the present invention can be applied to not only a stepping motor but also a permanent magnet type synchronous motor with inductor stator, a blushless motor or a generator for detecting rotation speed.

Further, while the toroidal coils are connected as the delta connection in the embodiment, they can be connected as the star connection with three-terminal feeding except the neutral point.

When a current is applied to two terminals of the delta connection for three-phase excitation, magnetomotive force occurs due to a stator coil current that is unique to the delta connection.

Further, since the phase differences among speed electromotive forces caused in the toroidal coils of the respective phases due to independent flux linkages are 120 degrees (electrical angle) between any two of the three terminals, magnetic flux from the permanent magnet rotor affects the stator unit of each phase independently.

Still further, each of the claw poles of the respective stator units shown in FIG. 1 is formed rectangular shape having constant width from the bottom to the tip. However, it is desirable that each of the claw poles is formed trapezoidal shape with a tapered tip. If the claw poles are formed trapezoidal shapes, the flux linkage from the permanent magnet passes through the slant surface of the claw pole, and therefore the waveform of the EMF detected from terminals of a toroidal coil can approach as much as possible a sine wave.

Since the transistor as a driving element employed in the driving circuit of FIG. 2 is required to have switching function only, they can be replaced with another switching element having the equivalent function.

Further, it is useful that a polar anisotropic magnet, which is anisotropic in the circumferential direction to be divided into the number of poles, is employed as the cylindrical permanent magnet. That's because a polar anisotropic magnet enables the cylindrical permanent magnet to form strong magnetic field with compact size.

In the above-described embodiment, the magnetometric sensors sense flux leakage from cylindrical permanent magnet of the permanent magnet rotor to detect the rotational position of the rotor. Alternatively, a permanent magnet for sensor having 2M magnetic poles that rotates in synchronism with the permanent magnet rotor may be employed in addition to the cylindrical permanent magnet.

Further, the cylindrical permanent magnet 16 shown in FIG. 7 may be protruded from the third stator unit 13 in the axial direction such that the magnetic poles of the outer periphery face the magnetometric sensors 31. The magnetic steel claw poles 41a, 41b and 41c shown in FIG. 8 may be bent to cover the outer periphery of the cylindrical permanent magnet so as to face the magnet with an air gap.

Further, in the above-described embodiment, the positional relationship between the claw poles of the stator units and the magnetic poles, which linearly extend in the axial direction, of the cylindrical permanent magnet in the circumferential direction is adjusted such that the phase differences among speed electromotive forces caused in the toroidal coils of the respective phases are 120 degrees (electrical angle) between any two of the three terminals of the star connection or the delta connection.

Alternatively, the claw poles of the corresponding stator magnetic poles of the stator units may be aligned in the axial direction. In such a case, the magnetic poles of the permanent magnet rotor are skewed with respect to the axial direction or the cylindrical permanent magnet is divided into three annular portions whose magnetic poles are deviated to each other in the circumferential direction. The positional relationship is adjusted by changing the skewed angle of the magnetic poles of the rotor or by changing the deviation of the magnetic poles of the annular portions.

Further, in the above-described embodiment, the rotational position of the permanent magnet rotor is detected by means of the magnetometric sensor. Alternatively, the rotational position of the permanent magnet rotor can be detected based on a waveform of exciting current modulated by a voltage induced in the respective toroidal coils by a magnetic field of the cylindrical permanent magnet without a sensor. In such a case, the toroidal coils are excited in order to produce a continuous rotation torque in the cylindrical permanent magnet based on the detected rotational position.

Still further, the toroidal coils are driven by two-phase excitation with two-terminal feeding for the star connection or three-terminal feeding for the delta connection. One toroidal coil that is not excited may be used as a sensor to detect the rotational position of the permanent magnet rotor by sensing speed electromotive force.

EFFECTS OF THE INVENTION

Since the three-phase toroidal coil type permanent magnet electric rotating machine of the present invention is constituted as above, there are the following superior effects.

(1) Since the phase differences among EMF's caused in the respective phases toroidal coils connected as a star connection or a delta connection are 120 degrees (electrical angle) between any two of the three terminals, magnetic flux from the permanent magnet rotor affects the stator unit of each phase independently.

Accordingly, torque of the rotational electric machine increases without torque pulsation. This reduces vibration and noise, and increases a positioning accuracy of an object to be driven in OA equipment or the like.

(2) The construction of a driving circuit (an excitation switching circuit) is simplified.

(3) Since the coils of all phases are excited and contribute to generate torque, the reliability of step drive is improved.

(4) Since the polar anisotropic magnet enables the cylindrical permanent magnet to form strong magnetic field with compact size, an improved rotor, which is small in the outer diameter and is large in the number of magnetic poles, can be constructed.

(5) Since the flux linkage from the permanent magnet passes through the slant surface of the claw pole, the waveform of the EMF detected from terminals of a toroidal coil can approach as much as possible a sine wave, which heavily attenuates torque pulsation.

(6) Since the rotational position of the permanent magnet rotor can be detected, the toroidal coils of the respective phases can be appropriately controlled by driving signal based on the rotational position detected.

(7) The rotational position of the rotor can be detected with a simple mechanism.

(8) The rotational position of the rotor can be accurately detected even if the angular interval among the magnetic poles is small.

(9) The rotational position of the rotor can be accurately detected without employing an additional sensor.

(10) One toroidal coil that is not excited is used a sensor to detect the rotational position of the permanent magnet rotor.

What is claimed is:

1. A three-phase toroidal coil type electric rotating machine comprising:

a permanent magnet rotor that comprises a cylindrical permanent magnet having M pairs of N-poles and S-poles that are alternatively arranged around a rotor axis; and a stator that comprises three stator units stacked in an axial direction with an air gap with respect to the external wall of said cylindrical permanent magnet, each of said stator units having a pair of stator magnetic poles and a toroidal coil that is sandwiched between said stator magnetic poles, each of said stator magnetic poles being made of magnetic material to have M pieces of claw poles extending in the axial direction, said stator magnetic poles of each stator unit being arranged such that the claw poles of the respective stator magnetic poles are in mesh with each other inside said toroidal coil;

wherein terminals of said toroidal coils mounted on said three stator units are connected as a star connection or a delta connection to be three-terminal feeding, wherein the rotor magnet poles are positioned so that flux linkage of each phase is independent flux linkage of only the corresponding phase thereof and the rotor magnet poles are opposite to the stator claw poles of each phase when the flux linkage becomes maximum, and wherein the positional relationship between said claw poles of said stator units and said cylindrical permanent magnet is determined such that the phase differences among speed electromotive forces caused in said toroidal coils of the respective phases due to said independent flux linkage are 120 degrees (electrical angle) between any two of said three terminals.

2. A control method of the three-phase toroidal coil type permanent magnet electric rotating machine according to claim 1, wherein said toroidal coils are controlled so as to feed the same electric currents through two of three toroidal coils of said stator units.

3. A three-phase toroidal coil type permanent magnet electric rotating machine comprising:

a permanent magnet rotor that comprises a cylindrical permanent magnet having M pairs of N-poles and S-poles that are alternatively arranged around a rotor axis; and a stator that comprises three stator units stacked in an axial direction with an air gap with respect to the external wall of said cylindrical permanent magnet, each of said stator units having a pair of stator magnetic poles and a toroidal coil that is sandwiched between said stator magnetic poles, each of said stator magnetic poles being made of magnetic material to have M pieces of claw poles extending in the axial direction, said stator magnetic poles of each stator unit being arranged such that the claw poles of the respective stator magnetic poles are in mesh with each other inside said toroidal coil;

wherein terminals of said toroidal coils mounted on said three stator units are connected as a delta connection to be three-terminal feeding, wherein the rotor magnet poles are positioned so that flux linkage of each phase is independent flux linkage of only the corresponding phase thereof and the rotor magnet poles are opposite to the stator claw poles of each phase when the flux linkage becomes maximum, and wherein said toroidal coils of the respective phases are excited such that the direction of the axial magnetomotive force generated by the toroidal coil of one phase, through which an electric current of a first magnitude passes, is opposite to that of the axial magnetomotive forces generated by the toroidal coils of the remaining two phases, through which electric currents of a second magnitude passes, when voltage is applied to two terminals with a three-phase excitation, said first magnitude being twice as large as said second magnitude.

4. The three-phase toroidal coil type permanent magnet electric rotating machine according to claim 1 or 3, wherein said cylindrical permanent magnet is a polar anisotropic magnet that is made of a single magnetic body and anisotropic in the circumferential direction to be divided into the number of poles.

5. The three-phase toroidal coil type permanent magnet electric rotating machine according to one of claims 1 and 3, wherein each of said claw poles is formed trapezoidal shape with a tapered tip.

6. The three-phase toroidal coil type permanent magnet electric rotating machine according to one of claims 1 and 3, further comprising:

a magnetometric sensor that detects variation of the magnetic field due to the rotation of said permanent magnet rotor;

a first switching element group that consists of three switching elements connected between a plus terminal of a power source and the terminals of said three toroidal coils, respectively; and a second switching element group that consists of three switching elements connected between a minus terminal of said power source and the terminals of said three toroidal coils, respectively, wherein said first and second switching element groups are controlled according to the output of said magnetometric sensor such that one switching element of said first switching element group and one switching element of said second switching element group are selected or one switching element of one switching element group and two switching elements of the other switching element group are selected to be turned ON or OFF.

7. The three-phase toroidal coil type permanent magnet electric rotating machine according to claim 6, wherein said magnetometric sensor is arranged to face said cylindrical permanent magnet or to face a permanent magnet for sensor, which has 2M magnetic poles and rotates in synchronism with said permanent magnet rotor, with an air gap.

8. The three-phase toroidal coil type permanent magnet electric rotating machine according to claim 6, further comprising a sensor pole made of magnetic material that is arranged to face said cylindrical permanent magnet or a permanent magnet for sensor having 2M magnetic poles that rotates in synchronism with said permanent magnet rotor with an air gap, and wherein said magnetometric sensor is arranged in the magnetic path passing through said sensor pole.

9. A control method of the three-phase toroidal coil type permanent magnet electric rotating machine according to one of claims 1 and 3, wherein the rotational position of said permanent magnet rotor is detected based on a waveform of exciting current modulated by a voltage induced in said respective toroidal coils by a magnetic field of said cylindrical permanent magnet, and wherein said toroidal coils are excited in order to produce a continuous rotation torque in said cylindrical permanent magnet based on the detected rotational position.

10. A control method of the three-phase toroidal coil type permanent magnet electric rotating machine according to claim 1, wherein said toroidal coils are driven by two-phase excitation with two-terminal feeding for the star connection or three-terminal feeding for the delta connection, and wherein one toroidal coil that is not excited is used as a sensor to detect the rotational position of said permanent magnet rotor by sensing speed electromotive force.

11. A three-phase toroidal coil electric rotating machine comprising:

a permanent magnet rotor comprising a cylindrical permanent magnet having M pairs of N-poles and S-poles that are alternatively arranged around a rotor axis;

a stator comprising three stator units stacked in an axial direction with an air gap with respect to the external wall of said cylindrical permanent magnet, each of said stator units having a pair of stator magnetic poles and a toroidal coil that is sandwiched between said stator magnetic poles, each of said stator magnetic poles being made of magnetic material to have M pieces of claw poles extending in the axial direction, said stator magnetic poles of each stator unit being arranged such that the claw poles of the respective stator magnetic poles are in mesh with each other inside said toroidal coil;

a magnetometric sensor that detects variation of the magnetic field due to the rotation of said permanent magnet rotor;

a first switching element group comprising three switching elements connected between a positive terminal of a power source and the terminals of said three toroidal coils, respectively; and a second switching element group comprising three switching elements connected between a negative terminal of said power source and the terminals of said three toroidal coils, respectively, wherein said first and second switching element groups are controlled according to the output of said magnetometric sensor such that one switching element of said first switching element group and one switching element of said second switching element group are selected or one switching element of one switching element group and two switching elements of the other switching element group are selected to be turned ON or OFF, and wherein said magnetometric sensor is arranged to face said cylindrical permanent magnet or to face a permanent magnet for sensor, which has 2M magnetic poles and rotates in synchronism with said permanent magnet rotor, with an air gap.

12. A three-phase toroidal coil electric rotating machine comprising:

a permanent magnet rotor comprising a cylindrical permanent magnet having M pairs of N-poles and S-poles that are alternatively arranged around a rotor axis;

a stator comprising three stator units stacked in an axial direction with an air gap with respect to the external wall of said cylindrical permanent magnet, each of said stator units having a pair of stator magnetic poles and a toroidal coil that is sandwiched between said stator magnetic poles, each of said stator magnetic poles being made of magnetic material to have M pieces of claw poles extending in the axial direction, said stator magnetic poles of each stator unit being arranged such that the claw poles of the respective stator magnetic poles are in mesh with each other inside said toroidal coil;

a magnetometric sensor that detects variation of the magnetic field due to the rotation of said permanent magnet rotor;

a sensor pole made of magnetic material that is arranged to face said cylindrical permanent magnet or a permanent magnet for sensor having 2M magnetic poles that rotates in synchronism with said permanent magnet rotor with an air gap, said magnetometric sensor being arranged in the magnetic path passing through said sensor pole;

a first switching element group comprising three switching elements connected between a positive terminal of a power source and the terminals of said three toroidal coils, respectively; and a second switching element group comprising three switching elements connected between a negative terminal of said power source and the terminals of said three toroidal coils, respectively, wherein said first and second switching element groups are controlled according to the output of said magnetometric sensor such that one switching element of said first switching element group and one switching element of said second switching element group are selected or one switching element of one switching element group and two switching elements of the other switching element group are selected to be turned ON or OFF.

* * * * *